United States Patent [19]

Paetzel

[11] Patent Number: 4,693,450
[45] Date of Patent: Sep. 15, 1987

[54] LOW-NOISE CONTROL VALVE

[75] Inventor: Herbert K. Paetzel, Nettetal-Hinsbeck, Fed. Rep. of Germany

[73] Assignee: Masoneilan International, Inc., Dallas, Tex.

[21] Appl. No.: 871,706

[22] Filed: Jun. 6, 1986

[30] Foreign Application Priority Data

Jun. 7, 1985 [DE] Fed. Rep. of Germany ....... 3520555

[51] Int. Cl.$^4$ ............................................. F16K 47/02
[52] U.S. Cl. .................................... 251/121; 251/127; 138/42; 138/43
[58] Field of Search .................. 251/121, 127; 138/42, 138/43

[56] References Cited

U.S. PATENT DOCUMENTS

| | | | |
|---|---|---|---|
| 977,427 | 12/1910 | Armstrong | 138/42 X |
| 4,007,908 | 2/1977 | Smagghe et al. | 251/127 |
| 4,125,129 | 11/1978 | Baumann | 251/127 X |
| 4,402,485 | 9/1983 | Fagerlund | 251/127 X |
| 4,511,258 | 4/1985 | Federighi et al. | 138/42 X |

OTHER PUBLICATIONS

Sulzer, Cataloge, dated 11/1983, *Static Mixing*.

*Primary Examiner*—Arnold Rosenthal

[57] ABSTRACT

A low-noise control valve in which a noise-dampening element (9) is arranged inside of the valve housing (1) in the passageway of the medium. A built-in element, in which lamellas touching one another are arranged over the entire cross section of passage parallel to each other and parallel to the direction of flow serves as noise-dampening element. These lamellas exhibit a linear corrugation, with the directions of the corrugations proceeding obliquely with respect to the direction of flow and the directions of the corrugations of two adjacent lamellas at a time intersecting each other. Favorable sound level reductions are achieved in small installation dimensions. In upper valves, the built-in element can be arranged at the valve cone. In rotary cone valves, it can be designed as a valve seat.

3 Claims, 5 Drawing Figures

LOW-NOISE CONTROL VALVE

TECHNICAL FIELD

The invention concerns a low-noise control valve with a housing.

BACKGROUND ART

The invention concerns a low-noise control valve with a housing, in which a valve cone is arranged which can be moved in relation to a valve seat and closes or opens the passageway of the medium and which possesses a connecting piece for inflow and a connecting piece for outflow, and in which inside of the housing in the passageway of the medium a noise-attenuating element is arranged, wherein inside of this element the passageway of the medium is divided into a multitude of sub-paths and the cross sections of passage of the sub-paths are small as compared to the cross section of passage of the valve.

Such low-noise control valves are known per se.

"Hole cages" arranged in the passageway or resistance packages arranged in the inflow or outflow serve, for instance, as noise-attenuating elements.

If an adequate sound level decrease of about 20 dB(A) is to be achieved with them, the known noise-dampening elements require relatively large installation space and costly construction.

The invention provides a low-noise control valve of the type of construction mentioned before in which at favorable effectiveness the noise-dampening element requires relatively little space. Besides the noise reduction, a change in the cavitation characteristic is achieved and the approach flow direction of the valve need not be specified. Finally, it should be possible to achieve certain, for instance linear, characteristics of the valve in spite of the presence of a noise-dampening element.

SUMMARY OF THE INVENTION

The basic concept of the invention consists in using as the noise-dampening element a built-in element which is known per se, but up to the present time was used for entirely different technical purposes. Such a built-in element is, for instance, described in Swiss Pat. No. 3,998,503. The described built-in element is used in material exchange columns, for instance rectifying columns, cooling towers or air humidifiers, in which a gas or a liquid are carried in counterflow and brought in contact.

It has become known furthermore (West German Pat. No. 2,205,371) to use such a built-in element as a static mixer for media flowing in parallel flow.

It turns out that this built-in element can be used in an excellent manner as a noise-dampening element in a control valve. In small installation space, excellent values are achieved for the lowering of the sound level. Besides, it has been shown that the application possibilities for this built-in element inside of the control valve are very many-sided. Thus, the built-in element used in the manner according to the invention can be arranged in the inlet, in the outlet or also directly in or on the valve cone or in or on the valve seat. As described in more detail below, the small installation space which this built-in element requires opens up the possibility of subsequently equipping conventional valves with a noise-dampening element.

The pronounced change in the cavitation characteristic when using the built-in element according to the invention makes it possible to work with higher differential pressures.

The noise-dampening element according to the invention can be made of all workable materials, i.e. for instance of metal on one hand and plastic or the other hand.

It can be used in very different valve constructions, i.e. on one hand in upper valves and on the other hand in rotary cone valves.

It can furthermore be arranged in such a way that the direction of flow of the valve need not be specified.

As explained in more detail below by means of examples of embodiments, it is possible to obtain certain forms of characteristics of a valve also when the built-in element according to the invention is used.

In an especially advantageous form of embodiment of an upper valve, which is described in more detail farther below, the built-in element is arranged in the valve cone. In this form of embodiment the capability of conversion of a conventional valve is possible in a special way while preserving its, for instance, linear characteristics.

In another advantageous form of embodiment on a rotary cone valve it is possible to design the built-in element of the invention itself as a valve seat, whereby an especially favorable noise-dampening effect is achieved.

BRIEF DESCRIPTION OF THE DRAWINGS

Below, examples of embodiment for the control valve according to the invention are explained in more detail with the help of the attached drawings.

DETAILED DESCRIPTION

Figure 1:
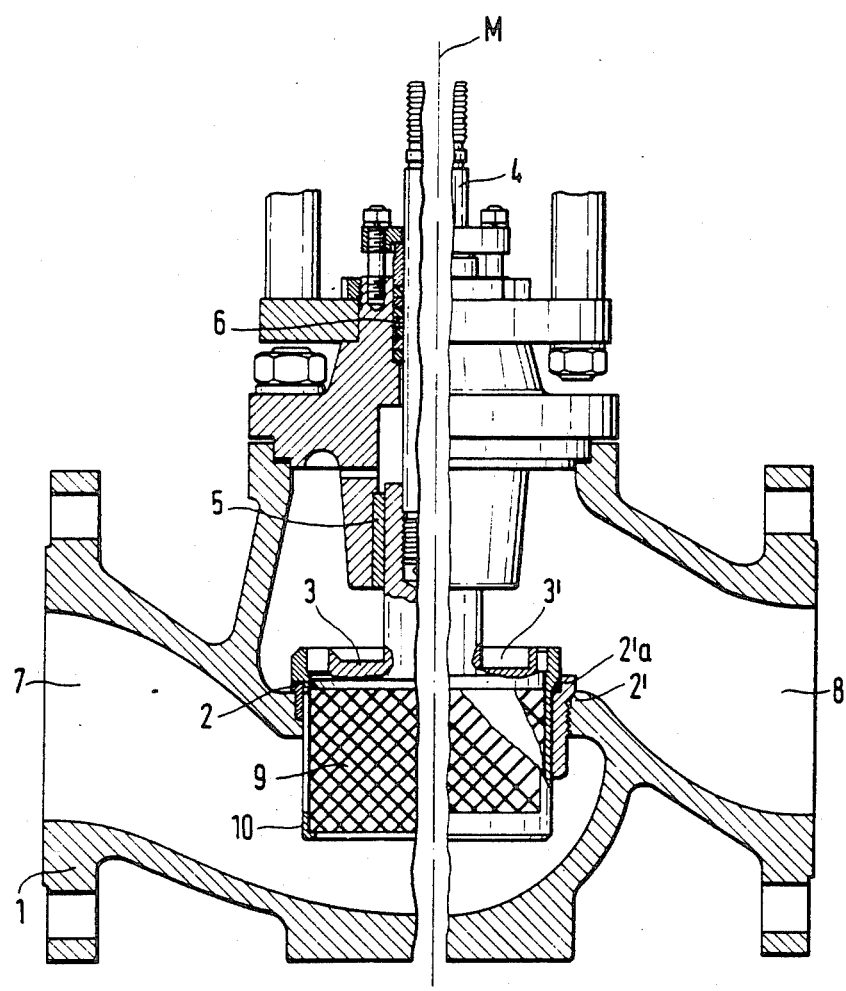
FIG. 1 shows a longitudinal section of an upper valve with a noise-dampening element.

FIG. 1 shows an upper valve of known construction, with slightly different forms of embodiment in regard to the design of the valve cone and valve seat being shown on the right and left sides of the center axis M of the valve stem 4.

The valve shown in FIG. 1 possesses a valve housing 1 with a connecting piece for inflow 7 and a connecting piece for outflow 8. In the inside of the valve housing a valve seat 2 or 2' is arranged, opposite which a valve cone 3 or 3', respectively, is located which is arranged at the inner end of tte valve stem 4. By lifting or lowering valve stem 4, which is inserted into the housing via openings 5 and 6, the valve cone 3 or 3' is lifted off the valve seat 2 or 2' with insert 2'a or placed onto same, effecting the opening or closing of the valve.

Figure 2:
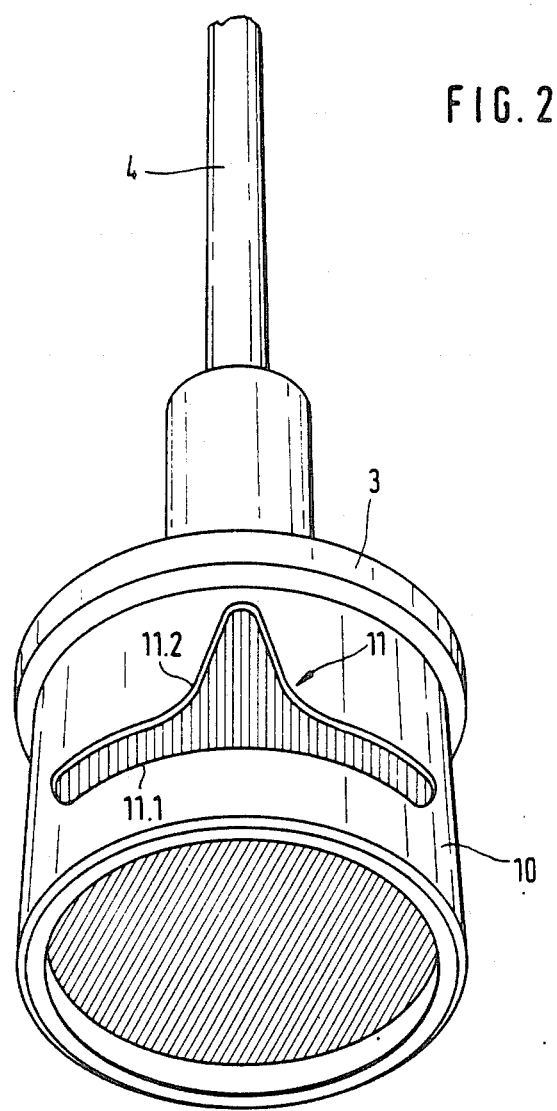
FIG. 2 shows a perspective, enlarged representation of a valve cone with a noise-dampening element of the upper valve according to FIG. 1.

As can be seen more accurately from FIG. 2, an extension 10, which extends in the direction of closing, passes through the valve seat 2 or 2' in a tight manner and is open towards the bottom, and is arranged at the side of the valve cone 3 facing the valve seat 2. In this extension 10 a built-in element 9 is arranged, which is indicated only schematically in FIGS. 1 and 2 and is explained in more detail below with the help of FIGS. 3 and 4.

Figure 3:
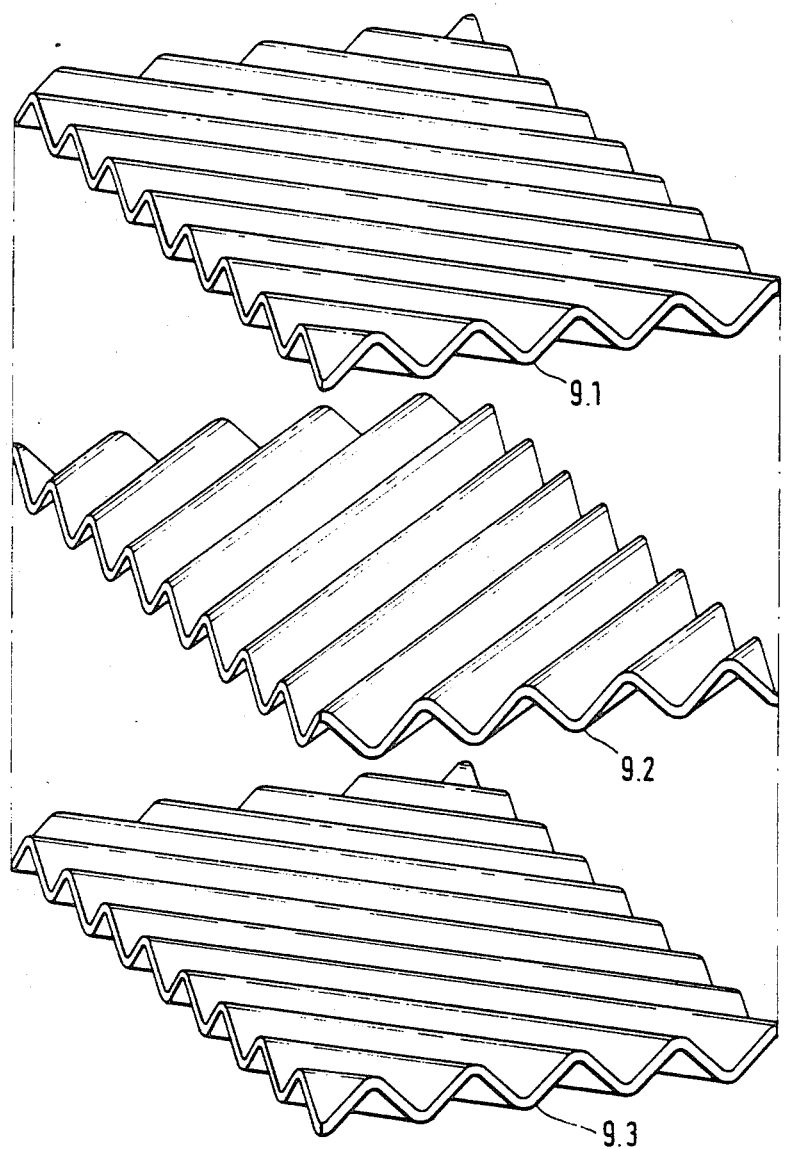
FIG. 3 shows an exploded perspective partial representation of details of the noise-dampening element at the upper valve according to FIGS. 1 and 2.

The built-in element 9 is constructed of individual lamellas which touch one another, are parallel with respect to each other and are parallel with respect to the axis of extension 10. Three of these lamellas 9.1, 9.2 and 9.3 are shown in FIG. 3 in exploded manner. The lamellas exhibit a linear corrugation and are arranged in such a way that the directions of the corrugations take an oblique course with respect to the axis of extension 10. It is also possible to use lamellas with a corrugation taking a curved course. As can be seen especially well from FIG. 4, the lamellas furthermore are arranged in such a way that the directions of the corrugations of two respective adjacent lamellas, thus for instance lamellas 9.2 and 9.3, intersect.

In this manner, a built-in element constructed of a multitide of lamellas is created and which is interspersed by a multitude of channels of flow which repeatedly branch off and connect to one another.

If, as in the example of embodiment shown in FIGS. 1 and 2, the built-in element is to have a cylindrical shape, the lamellas are constructed in such a way that for the successive lamellas the width increases going from the outside towards the inside. Thereby, a cylindrical block is created, which is inserted in extension 10 in such a way that the lamellas themselves take a parallel course with respect to the cylinder axis. The directions of the corrugations, on the other hand, in each instance take an oblique course with respect to the cylinder axis and in adjacent lamellas form an acute angle with each other.

Several possibilities exist in regard to the direction of flow of the built-in element described. Advantageously, the direction of flow is selected parallel with respect to the planes of the lamellas, i.e. flow can take place either in the direction of the front surfaces of the cylindrical built-in element or in the direction towards the cylindrical surface, which corresponds to the direction of the lamellas.

In the example of embodiment shown, entering through the connecting piece for inflow 7, the medium can for instance flow from the bottom towards the valve cone 3, wherein it enters into the extension 10 which is open on the bottom, and thereby flow takes place towards the built-in element 9 from the direction of the lower front surface.

As can be seen from FIG. 2, an opening 11 is provided in the cylindrical surface of extension 10, through which the medium exits when the valve cone 3 is lifted up. The shape of this opening is selected in such a way that it is composed of a slot 11.1 which in the circumferential direction of the extension 10 extends over a certain angular range, and of an opening 11.2 which connects to this slot towards the side of the valve cone 3 and tapers off in this direction. The tapered opening 11.2 has a contour which essentially corresponds to a bell-shaped curve. The purpose of this special design of the opening 11 is to achieve a linear characteristic for the valve shown in FIG. 1. That is to say that it turned out that the built-in element described possesses a passage characteristic which on increasing opening takes a curved course flattening in the upward direction. The exact form of the bell-shaped curve of the opening part 11.2 is now calculated in such a way that the total opening 11 for itself alone produces a characteristic which is curved in the opposite direction as is the characateristic of the built-in element 9. As can be read off directly from FIG. 2, when the valve is opened, the cross section of passage of opening 11 widens in more pronounced fashion than linear. By the overlapping of the two characteristics of the built-in element 9 and the opening 11 a linear characteristic is achieved altogether.

Of course, this compensation of the characteristics can also be achieved by other shapes of openings in the cylindrical surface of the extension 10.

Thus, for instance, several openings distributed over the cylindrical surface, for instance boreholes, can be present whose density and/or diameter decreases in the direction to the valve cone 3. This decrease in turn can be adjusted in such a way that a compensation of the characteristics of the passage, and thereby altogether a linear characteristic, are achieved.

It goes without saying that in the upper valve shown in FIGS. 1 and 2, the direction of flow is not specified. Connecting piece 8 can therefore also serve as connecting piece for inflow, with the medium entering into built-in element 9 through the opening 11 and exiting downwards towards connecting piece 7.

Due to the multitude of repeatedly crossing component currents of the medium forming inside of built-in element 9, a pronounced energy conversion occurs and thereby a corresponding noise reduction.

Of course, the built-in element described can also be used in upper valves of different construction, for instance it can be formed as an outer cone.

It is especially advantageous that a conventional upper valve of the construction according to FIG. 1 without noise-dampening element can be converted by subsequently installing, for instance, a valve cone such as shown in FIG. 2.

The length and diameter of the built-in element 9 depend on the space relationships and the noise reduction aimed for. It has been shown that a ratio of length to diameter up to a maximum of 2 is adequate.

Figure 5:
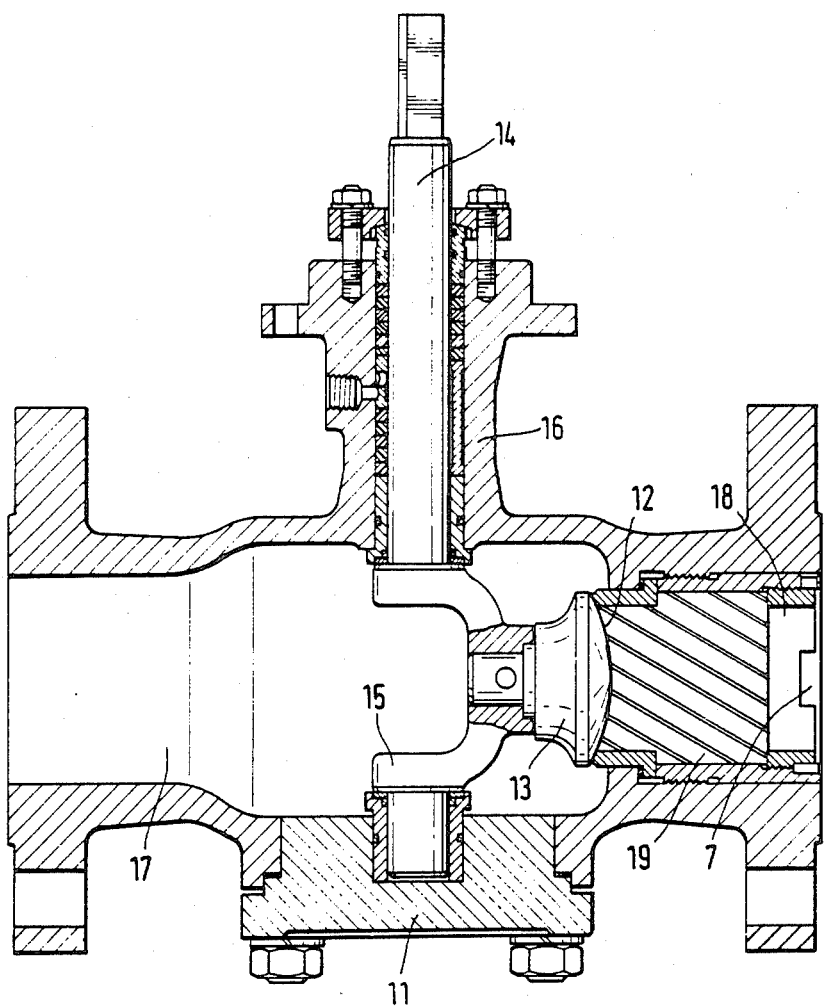
FIG. 5 shows a longitudinal section of a rotary cone valve with a noise-dampening element.

FIG. 5 shows a rotary cone valve with a housing 11, a connecting piece for inflow 17, a connecting piece for outflow 18 and a rotary cone 13 arranged in the housing, which via a connecting element 15 is connected to a rotatable stem 14 introduced into the housing via a lead-through 16.

Figure 4:
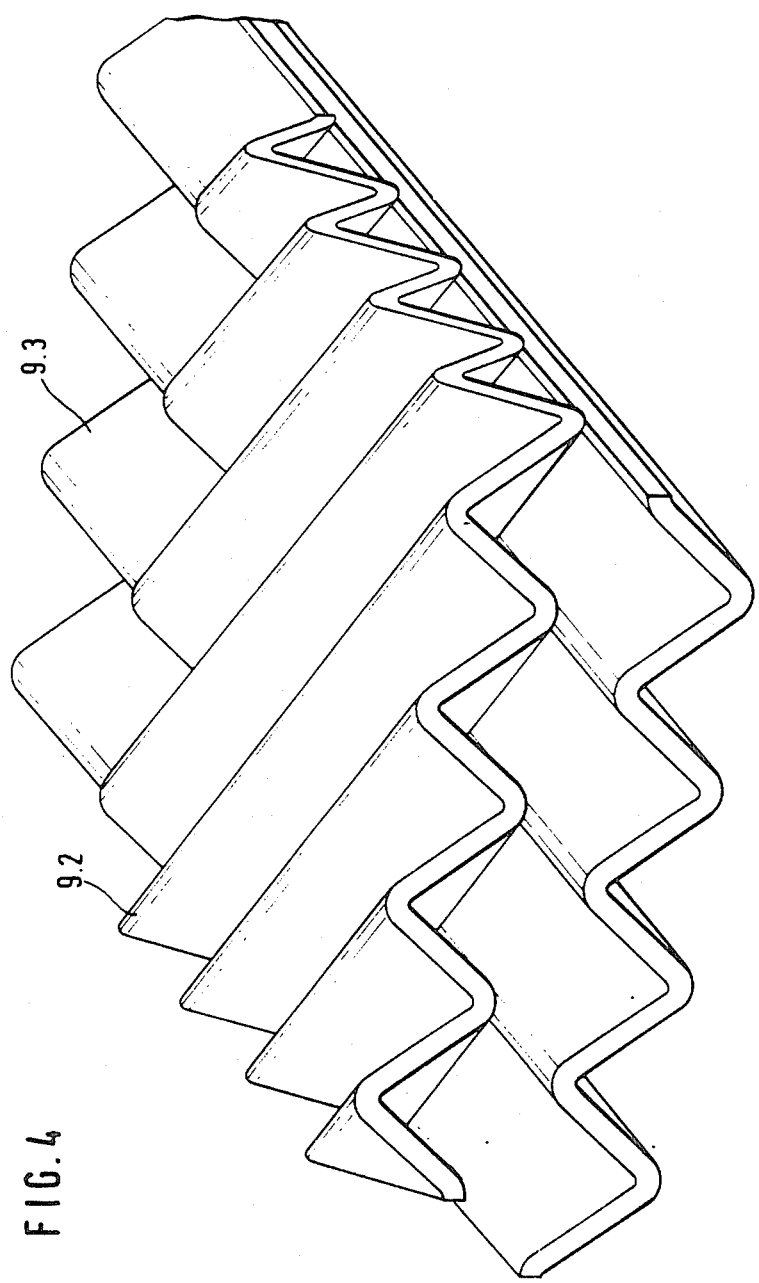
FIG. 4 shows a composite perspective partial representation of the details according to FIG. 3.

Arranged opposite rotary cone 13, is a built-in element 19 extending over the entire cross section of passage, which like the built-in element 9 described farther above has a cylindrical shape and in the same manner as described with the help of FIGS. 3 and 4 is constructed of adjacent lamellas provided with a corrugation. The lamellas are likewise arranged parallel to the direction Z of the cylinder axis and corrugations, in each instance take an oblique course with respect to this cylinder axis, wherein the corrugations of adjacent lamellas intersect in the manner already described. In the built-in element 19 the direction of flow proceeds from one front surface to the other, i.e. parallel with respect to cylinder axis Z. The front surface of the built-in element 19 facing the valve cone 13 is adapted to the spherical shape of the sealing surface of the valve cone 13 and in sealing manner fits against the sealing surface of valve cone 13. It is thereby achieved that the valve seat 12 is formed by the concave spherically curved front surface of built-in element 19. On opening valve cone 13 by swivelling, an increasingly enlarging inflow surface is freed at the built-in element 19. Due to the direct inflow of the medium into built-in element 19 at the valve seat, an especially favorable noise-reducing effect is obtained. It turned out furthermore that in the rotary cone valve of the special design and arrangement of the built-in element 19, a characteristic is achieved which influences the natural characteristic of a rotary cone valve in such a way that it becomes more linear, at least in the wider opening range.

Of course, the direction of flow can be changed also in the valve shown in FIG. 5.

The valve can also be provided with a soft-sealing valve cone which can, for instance, be achieved by the arrangement of an O-ring (not shown) in the sealing surface of valve cone 13.

I claim:

1. In a low noise upper control valve with a housing, in which a valve cone is arranged which can be moved in relation to a valve seat for closing or opening the passageway of the medium and which possesses a connecting piece for inflow and a connecting piece for outflow, and in which inside of the housing in the passageway of the medium a noise-attenuating element is arranged and inside of this element the passageway of the medium is divided into a multitude of sub-paths and the cross sections of passage of the sub-paths are small as compared to the cross section of passage of the valve, an improved noise attenuating element, comprising:

lamellas which touch one another and are arranged over the entire cross section of the passage parallel to each other and parallel to the direction of flow, the lamellas being corrugated, with the directions of the corrugations proceeding obliquely with respect to the direction of flow and the directions of the corrugations of two adjacent lamellas intersecting each other;

the valve cone having a hollow-cylindrical extension which extends in the direction of closing, passes through the valve seat in a tight manner and is open at the free end and in which extension the nosie attenuation element is arranged and at least one opening for the medium is arranged in the cylindrical surface of the extension so that when the valve cone is lifted off, the medium flows exclusively through the noise attenuation element; and the element having a ratio of length to diameter in a range up to a maxium of two.

2. A control valve according to claim 1, wherein the opening is composed of a slot which in the circumferential direction extends over an angular range and of an opening which connects to the slot in the opening direction and tapers off in this direction, with the contour of the tapered opening essentially possessing the shape of a bell-shaped curve.

3. A control valve according to claim 1, wherein several openings are arranged in the cylindrical surface distributed over the circumference, with the density and/or the cross section of these openings becoming smaller in the opening direction of the valve cone.

* * * * *